(12) United States Patent
Nagarajayya

(10) Patent No.: US 7,792,811 B2
(45) Date of Patent: Sep. 7, 2010

(54) INTELLIGENT SEARCH WITH GUIDING INFO

(75) Inventor: Nagendra Nagarajayya, Pleasanton, CA (US)

(73) Assignee: transaxtions LLC, Pleasanton, CA (US)

( * ) Notice: Subject to any disclaimer, the term of this patent is extended or adjusted under 35 U.S.C. 154(b) by 1227 days.

(21) Appl. No.: 11/306,332

(22) Filed: Dec. 22, 2005

(65) Prior Publication Data

US 2008/0104047 A1 May 1, 2008

Related U.S. Application Data

(60) Provisional application No. 60/653,349, filed on Feb. 16, 2005.

(51) Int. Cl.
G06F 7/00 (2006.01)
G06F 17/30 (2006.01)

(52) U.S. Cl. .................. 707/706; 707/711; 707/727; 707/731; 707/741; 707/751; 707/765

(58) Field of Classification Search .................. None
See application file for complete search history.

(56) References Cited

U.S. PATENT DOCUMENTS

| | | | |
|---|---|---|---|
| 5,265,065 A | 11/1993 | Turtle | 707/4 |
| 5,321,833 A | 6/1994 | Chang et al. | 707/5 |
| 5,511,186 A | 4/1996 | Carhart et al. | |
| 5,544,352 A | 8/1996 | Egger | 707/5 |
| 5,577,241 A | 11/1996 | Spencer | 707/5 |
| 5,659,732 A | 8/1997 | Kirsch | 707/5 |
| 5,920,854 A | 7/1999 | Kirsch et al. | 707/3 |
| 5,933,822 A | 8/1999 | Braden-Harder et al. | 707/5 |
| 6,070,158 A | 5/2000 | Kirsch et al. | 707/3 |
| 6,078,914 A | 6/2000 | Redfern | 707/3 |
| 6,145,003 A | 11/2000 | Sanu et al. | 709/225 |
| 6,233,571 B1 | 5/2001 | Egger et al. | 707/2 |
| 6,256,623 B1 | 7/2001 | Jones | 707/3 |
| 6,275,820 B1 | 8/2001 | Navin-Chandra et al. | 707/3 |
| 6,278,993 B1 | 8/2001 | Kumar et al. | 707/3 |
| 6,317,741 B1 | 11/2001 | Burrows | 707/5 |
| 6,336,116 B1 | 1/2002 | Brown et al. | 707/10 |
| 6,434,548 B1 | 8/2002 | Emens et al. | 707/3 |
| 6,442,544 B1 | 8/2002 | Kohli | 707/5 |
| 6,453,315 B1 | 9/2002 | Weissman et al. | 707/5 |
| 6,480,837 B1 | 11/2002 | Dutta | 707/3 |
| 6,484,166 B1 | 11/2002 | Maynard | 707/5 |
| 6,490,575 B1 | 12/2002 | Berstis | 707/3 |
| 6,523,026 B1 | 2/2003 | Gillis | 707/3 |
| 6,523,028 B1 * | 2/2003 | DiDomizio et al. | 707/5 |
| 6,526,400 B1 | 2/2003 | Takata et al. | 707/3 |
| 6,560,600 B1 | 5/2003 | Broder | 707/7 |
| 6,578,022 B1 | 6/2003 | Foulger et al. | 706/45 |
| 6,665,655 B1 | 12/2003 | Warner et al. | 707/2 |
| 6,687,696 B2 | 2/2004 | Hofmann et al. | 707/6 |
| 6,701,312 B2 | 3/2004 | Lau et al. | 707/5 |
| 6,704,722 B2 | 3/2004 | Wang Baldonado | 707/3 |
| 6,714,934 B1 | 3/2004 | Fordham | 707/100 |

(Continued)

*Primary Examiner*—Charles Rones
*Assistant Examiner*—Charles D Adams

(57) ABSTRACT

Every presence has needs. A need could be consumer electronics, loans, autos, or knowledge, etc. The presence uses search engines to become knowledgeable about the need. The current search engines are not intelligent. The idea of the invention is to provide more accurate results and semantically linked results through an intelligent index. The invention uses results from known, semantic and unknown indexes with Guiding Information to return the most relevant results to the users.

18 Claims, 11 Drawing Sheets

U.S. PATENT DOCUMENTS

| | | | |
|---|---|---|---|
| 6,718,324 B2 | 4/2004 | Edlund et al. | 707/5 |
| 6,728,704 B2 | 4/2004 | Mao et al. | 707/3 |
| 6,757,675 B2 | 6/2004 | Aiken et al. | 707/3 |
| 6,763,362 B2 | 7/2004 | McKeeth | 707/104.1 |
| 6,766,316 B2 | 7/2004 | Caudill et al. | 707/3 |
| 6,766,320 B1 | 7/2004 | Wang et al. | 707/5 |
| 6,785,671 B1 | 8/2004 | Bailey et al. | 707/3 |
| 6,799,176 B1 | 9/2004 | Page | 707/5 |
| 6,801,906 B1 | 10/2004 | Bates et al. | 707/3 |
| 6,947,920 B2 | 9/2005 | Alpha | 707/1 |
| 6,947,932 B2 | 9/2005 | Brandin et al. | 707/6 |
| 6,947,936 B1 | 9/2005 | Suermondt et al. | 707/7 |
| 6,950,814 B2 | 9/2005 | Bergan et al. | 706/55 |
| 6,961,723 B2 | 11/2005 | Faybishenko et al. | 707/3 |
| 6,961,731 B2 | 11/2005 | Holbrook | 707/102 |
| 6,963,867 B2 | 11/2005 | Ford et al. | 707/3 |
| 2002/0152199 A1 | 10/2002 | Teng et al. | 707/3 |
| 2003/0120653 A1 | 6/2003 | Brady et al. | 707/7 |
| 2003/0135477 A1* | 7/2003 | Elsey et al. | 707/1 |
| 2004/0010484 A1 | 1/2004 | Foulger et al. | 706/50 |
| 2004/0024756 A1 | 2/2004 | Rickard | |
| 2004/0030690 A1 | 2/2004 | Teng et al. | 707/3 |
| 2004/0044657 A1 | 3/2004 | Lee | 707/3 |
| 2004/0243568 A1 | 12/2004 | Wang et al. | 707/3 |
| 2004/0254917 A1 | 12/2004 | Brill et al. | 707/3 |
| 2004/0260688 A1 | 12/2004 | Gross | 707/3 |
| 2005/0004905 A1 | 1/2005 | Dresden | 707/3 |
| 2005/0055340 A1 | 3/2005 | Dresden | 707/3 |
| 2005/0060304 A1* | 3/2005 | Parikh | 707/3 |
| 2005/0076021 A1 | 4/2005 | Wu et al. | 707/3 |
| 2005/0120006 A1 | 6/2005 | Nye | 707/3 |
| 2005/0203878 A1* | 9/2005 | Brill et al. | 707/3 |
| 2005/0216434 A1 | 9/2005 | Haveliwala et al. | 707/1 |
| 2005/0240756 A1* | 10/2005 | Mayer | 713/2 |

* cited by examiner 101
102
103
104

Results from Known Index ( known terms := xml escaping )

http://www.w3c.com/xml, xml, 1.0

Results from Semantic Index ( semantic terms := xml and ( escaping or encoding or decoding ) )

http://msdn.microsoft.com/en-us/library/35577sxd.aspx, Encode and Decode XML Element and Attribute Names, 1.0
http://en.wikipedia.org/wiki/Base64, Base64 - Wikipedia, the free encyclopedia, 1.0
http://en.wikipedia.org/wiki/Character_encodings_in_HTML, Character encodings in HTML - Wikipedia, the free encyclopedia, 1.0
http://forums.sun.com/thread.jspa?threadID=5336392, Java Technology & XML - encoding - decoding characters for xml, 1.0
http://www.download3k.com/Software-Development/Coding-languages-Compilers/Download-URL-Escaped-Encoding-Decoder.html, Download URL Escaped Encoding Decoder 1.0 Free - It is used to ..., 1.0
http://wareseeker.com/the-url-escaped-encoding-decoder/, the url escaped encoding decoder Free Download, 1.0
http://docs.python.org/library/codecs.html, 8.8. codecs ? Codec registry and base classes ? Python v2.6.4 ..., 1.0
http://www.amk.ca/python/howto/unicode, Unicode HOWTO, 1.0
http://www.owasp.org/index.php/How_to_perform_HTML_entity_encoding_in_Java, How to perform HTML entity encoding in Java - OWASP, 1.0
http://www.w3c.com/xml, xml, 1.0

Results from Unknown Index ( unknown terms := xml escaping )

http://www.jmhu.com/msg/1A9177.html, XML escaping and unescaping, 1.0
http://www.xml.com/pub/a/2003/08/20/embedded.html, XML.com: Escaped Markup Considered Harmful, 1.0
http://weblogs.sqlteam.com/mladenp/archive/2008/10/21/Different-ways-how-to-escape-an-XML-string-in-C.aspx, Different ways how to escape an XML string in C#, 1.0
http://lambda-the-ultimate.org/node/1686, Escape sequence for XML | Lambda the Ultimate, 1.0
http://www.w3.org/TR/REC-xml/, Extensible Markup Language (XML) 1.0 (Fifth Edition), 1.0
http://www.hdfgroup.org/HDF5/XML/xml_escape_chars.htm, Technical Note: Escape Characters for XML/HDF5, 1.0
http://www.xmlnews.org/docs/xml-basics.html, XML Basics, 1.0
http://www.csharper.net/blog/escape_xml_string_characters_in_c_.aspx, C# Shiznit - Escape XML string characters in C#, 1.0
http://weblogs.asp.net/smehaffie/archive/2009/08/16/escaping-unescaping-xml-data.aspx, Escaping/Unescaping XML Data - Shawn's Technical Blog, 1.0
http://www.w3schools.com/xml/xml_cdata.asp, XML CDATA, 1.0
http://msdn.microsoft.com/en-us/library/35577sxd.aspx, Encode and Decode XML Element and Attribute Names, 1.01
http://en.wikipedia.org/wiki/Character_encodings_in_HTML, Character encodings in HTML - Wikipedia, the free encyclopedia, 1.01
http://msdn.microsoft.com/en-us/library/35577sxd.aspx, Encode and Decode XML Element and Attribute Names, 1.01
http://www.w3c.com/xml, XML - W3C, 1.01
http://www.w3schools.com/jsref/jsref_escape.asp, JavaScript escape() Function, 1.01

Results from Known Index
( known terms := xml escaping )
http://www.w3c.org/xml, xml, 1.0

Results from Semantic Index
( semantic terms := xml and ( escaping or encoding or decoding ) )
http://forums.sun.com/thread.jspa?threadID=5336392, Java Technology & XML - encoding - decoding characters for xml, 1.01
http://msdn.microsoft.com/en-us/library/35577sxd.aspx, Encode and Decode XML Element and Attribute Names, 1.0
http://en.wikipedia.org/wiki/Base64, Base64 - Wikipedia, the free encyclopedia, 1.0
http://en.wikipedia.org/wiki/Character_encodings_in_HTML, Character encodings in HTML - Wikipedia, the free encyclopedia, 1.0
http://www.download3k.com/Software-Development/Coding-languages-Compilers/Download-URL-Escaped-Encoding-Decoder.html, Download URL Escaped Encoding Decoder 1.0 Free - It is used to ..., 1.0
http://wareseeker.com/the-url-escaped-encoding-decoder/, the url escaped encoding decoder Free Download, 1.0
http://docs.python.org/library/codecs.html, 8.8. codecs ? Codec registry and base classes ? Python v2.6.4 ..., 1.0
http://www.amk.ca/python/howto/unicode, Unicode HOWTO, 1.0
http://www.owasp.org/index.php/How_to_perform_HTML_entity_encoding_in_Java, How to perform HTML entity encoding in Java - OWASP, 1.0

Results from Unknown Index
( unknown terms := xml escaping )
http://www.junlu.com/msg/127177.html, XML escaping and unescaping, 1.0
http://www.xml.com/pub/a/2003/08/20/embedded.html, XML.com: Escaped Markup Considered Harmful, 1.0
http://weblogs.sqlteam.com/mladenp/archive/2008/10/21/Different-ways-how-to-escape-an-XML-string-in-C.aspx, Different ways how to escape an XML string in C#, 1.0
http://lambda-the-ultimate.org/node/1686, Escape sequence for XML | Lambda the Ultimate, 1.0
http://www.w3.org/TR/REC-xml/, Extensible Markup Language (XML) 1.0 (Fifth Edition), 1.0
http://www.hdfgroup.org/HDF5/XML/xml_escape_chars.htm, Technical Note: Escape Characters for XML/HDF5, 1.0
http://www.xmlnews.org/docs/xml-basics.html, XML Basics, 1.0
http://www.csharper.net/blog/escape_xml_string_characters_in_c_.aspx, C# Shiznit - Escape XML string characters in C#, 1.0
http://weblogs.asp.net/smehaffie/archive/2009/08/16/escaping-unescaping-xml-data.aspx, Escaping/Unescaping XML Data - Shawn's Technical Blog, 1.0
http://www.w3schools.com/xml/xml_cdata.asp, XML CDATA, 1.0
http://msdn.microsoft.com/en-us/library/35577sxd.aspx, Encode and Decode XML Element and Attribute Names, 1.01
http://en.wikipedia.org/wiki/Character_encodings_in_HTML, Character encodings in HTML - Wikipedia, the free encyclopedia, 1.01
http://msdn.microsoft.com/en-us/library/35577sxd.aspx, Encode and Decode XML Element and Attribute Names, 1.01
http://www.w3c.com/xml, XML - W3C, 1.01
http://www.w3schools.com/jsref/jsref_escape.asp, JavaScript escape() Function, 1.01

Results from Known Index
( known terms := xml escaping )
http://www.w3c.org/xml, xml, 1.01

Results from Semantic Index
( semantic terms := xml and ( escaping or encoding or decoding ) )
http://forums.sun.com/thread.jspa?threadID=5336392, Java Technology & XML - encoding - decoding characters for xml, 1.01
http://msdn.microsoft.com/en-us/library/35577sxd.aspx, Encode and Decode XML Element and Attribute Names, 1.0
http://en.wikipedia.org/wiki/Base64, Base64 - Wikipedia, the free encyclopedia, 1.0
http://en.wikipedia.org/wiki/Character_encodings_in_HTML, Character encodings in HTML - Wikipedia, the free encyclopedia, 1.0
http://www.download3k.com/Software-Development/Coding-languages-Compilers/Download-URL-Escaped-Encoding-Decoder.html, Download URL Escaped Encoding Decoder 1.0 Free - It is used to ..., 1.0
http://wareseeker.com/the-url-escaped-encoding-decoder/, the url escaped encoding decoder Free Download, 1.0
http://docs.python.org/library/codecs.html, 8.8. codecs ? Codec registry and base classes ? Python v2.6.4 ..., 1.0
http://www.amk.ca/python/howto/unicode, Unicode HOWTO, 1.0
http://www.owasp.org/index.php/How_to_perform_HTML_entity_encoding_in_Java, How to perform HTML entity encoding in Java - OWASP, 1.0

Results from Unknown Index
( unknown terms := xml escaping )
http://www.juhu.com/msg/1277.html, XML escaping and unescaping, 1.0
http://www.xml.com/pub/a/2003/08/20/embedded.html, XML.com: Escaped Markup Considered Harmful, 1.0
http://weblogs.sqlteam.com/mladenp/archive/2008/10/21/Different-ways-how-to-escape-an-XML-string-in-C.aspx, Different ways how to escape an XML string in C#, 1.0
http://lambda-the-ultimate.org/node/1686, Escape sequence for XML | Lambda the Ultimate, 1.0
http://www.w3.org/TR/REC-xml/, Extensible Markup Language (XML) 1.0 (Fifth Edition), 1.0
http://www.hdfgroup.org/HDF5/XML/xml_escape_chars.htm, Technical Note: Escape Characters for XML/HDF5, 1.0
http://www.xmlnews.org/docs/xml-basics.html, XML Basics, 1.0
http://www.csharper.net/blog/escape_xml_string_characters_in_c_.aspx, C# Shiznit - Escape XML string characters in C#, 1.0
http://weblogs.asp.net/smehaffie/archive/2009/08/16/escaping-unescaping-xml-data.aspx, Escaping/Unescaping XML Data - Shawn's Technical Blog, 1.0
http://www.w3schools.com/xml/xml_cdata.asp, XML CDATA, 1.0
http://msdn.microsoft.com/en-us/library/35577sxd.aspx, Encode and Decode XML Element and Attribute Names, 1.01
http://en.wikipedia.org/wiki/Character_encodings_in_HTML, Character encodings in HTML - Wikipedia, the free encyclopedia, 1.01
http://msdn.microsoft.com/en-us/library/35577sxd.aspx, Encode and Decode XML Element and Attribute Names, 1.01
http://www.w3c.com/xml, XML - W3C, 1.01
http://www.w3schools.com/jsref/jsref_escape.asp, JavaScript escape() Function, 1.01

234

1001   1003

1002

INTELLIGENT SEARCH WITH GUIDING INFO

CROSS-REFERENCE TO RELATED APPLICATIONS

This application claims priority of U.S. provisional application, Ser. No. 60/653,349, titled "Intelligent Search With Guiding Info" filed Feb. 16, 2005 by the present applicant.

This application references U.S. patent application Ser. No. 11/162,735 titled "Using Popular IDs To Sign On Creating A Single ID For Access" filed Sep. 21, 2005 by the present applicant.

This application references U.S. application Ser. No. 11/161,897, titled "Obtaining A Need With Guiding Information And Credit Worthiness Using A Competitive Process" filed Aug. 22, 2005 by the present applicant.

This application refers to the U.S. provisional application No. 60/656,645, titled "Guiding Info Tabs With Guide Selection" filed Feb. 23, 2004 by the present applicant.

FIELD OF THE INVENTION

The present invention relates to searching on the internet or the intranet using the intelligence of the users on the net.

BACKGROUND OF THE INVENTION

Search engines never return what you want. They are good for general searches, but as your use advances, one seems to click on multiple pages, multiple links to get to the relevant information. Ranking by number of links has led to web masters linking with each other, increasing the number of links referencing a page, giving the page a higher rank. A higher rank allows the pages to be the first links in search results but the content might not be what the user is looking for. So when you search for a term as a mortgage loan or escaping xml, etc. you get results that might not be meaningful.

When a user searches for "Taco Bell" or "Panasonic TV" or "Laptop computer" or "need a mortgage loan", the user is expecting to get information related to finding the restaurant "Taco Bell", or buying a "Panasonic TV" or a "Laptop computer" or information about a "mortgage loan". A user searching for "Panasonic TV" expects to see the popular models, models on sale, market competitive information, information about TVs, LCD TVs, etc. A user searching for a "Laptop computer" is interested in knowing more about a laptop computer, a computer, different models on sale, popular selections, market information, etc. For a "mortgage loan" or "need a mortgage loan" the user might be interested in, what is a mortgage loan?, types of loan products, current interest rates, different mortgage brokers, bankers, market competitive information, etc. A user searching for "relief from cough" or "tantrums 10 yr old" is looking to find information related to finding an immediate relief to the cough or how to overcome the tantrums thrown by the 10 yr old. The search engines with natural language ability do try to understand the context but again might not present the information needed by the user.

A definite need exists for an intelligent search engine with guiding information that could overcome the problems associated and described above. The idea is to use known information, semantic information and the intelligence of the users on the net to build an intelligent index that could present relevant information. Guiding Information, patent pending U.S. application Ser. No. 11/161,897 with Guide Selections provides expert information about a category and sub category along with market competitive information. So a user searching for a laptop computer can immediately become knowledgeable about buying a laptop and buy one online. A user searching for mortgage loans gets guiding information about mortgage, loans and can proceed on to buying one, while a user searching for "XML escaping", will get information related to the problem of escaping XML. A primary purpose of the present invention is to solve these needs and provide further, related advantages.

BRIEF DESCRIPTION OF THE INVENTION

Every presence has needs. A need could be consumer electronics, loans, autos, etc. The presence uses search engines to start looking for information related to electronics like laptops, loans, autos, etc. According to Comscore, users typically start their buying process at the search engines with generic terms like "lcd tv" become knowledgeable and then proceed either to a store or buy online. Most searches engines build their indexes on keyword density, page ranking based on number of links, etc. None are intelligent today. The idea of the invention is to provide more accurate results and semantically linked results of what a user is looking for. The invention uses results from known, semantic and unknown indexes with Guiding Information to return the most meaningful and relevant results.

BRIEF DESCRIPTION OF THE DRAWINGS

The accompanying drawings, which are incorporated into and constitute a part of this specification, illustrate one or more embodiments of the present invention and, together with detailed description, serve to explain the principles and implementations of the invention.

Figure 1:
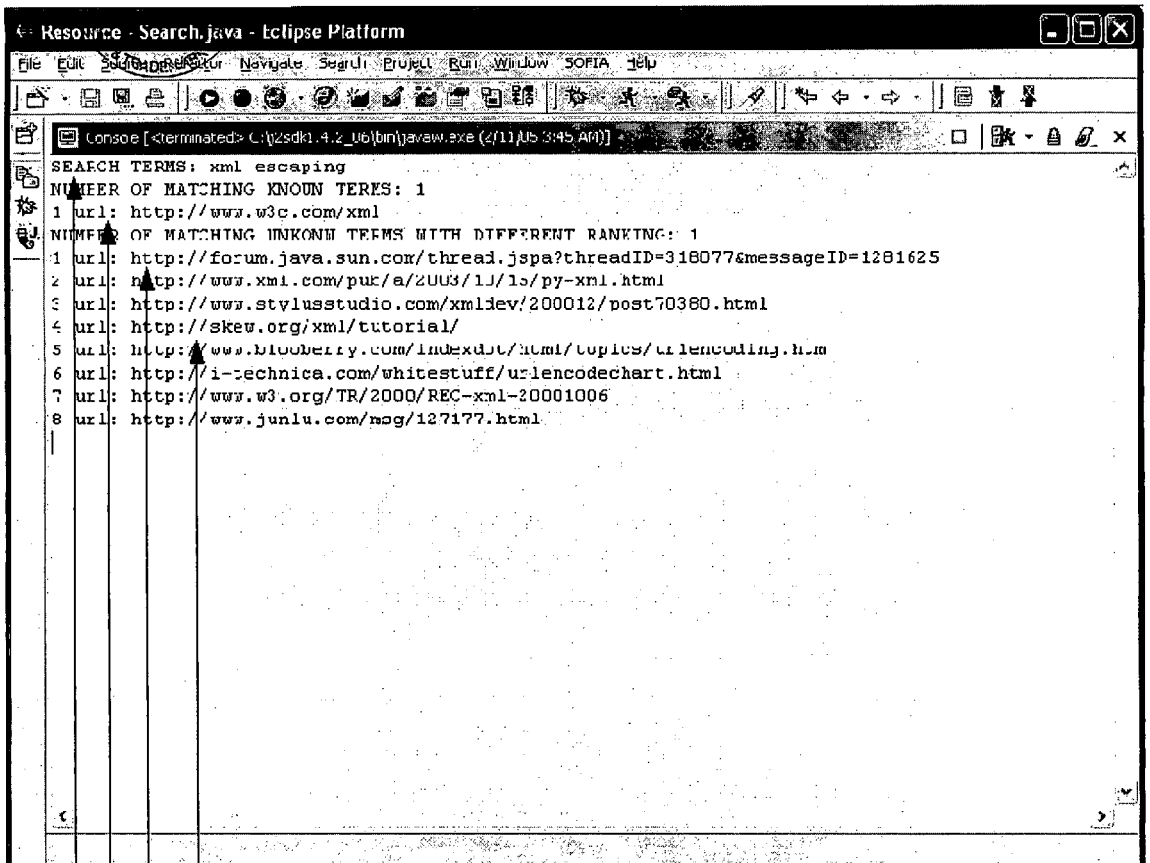
FIG. 1 is an illustration of a user searching for the term "xml escaping".

REFERENCES CITED
U.S. patent documents

| | | | |
|---|---|---|---|
| 6,961,731 | November 2005 | Holbrook | 707/102 |
| 5,511,186 | April 1996 | Carhart, et al. | |
| 6,961,723 | November 2005 | Faybishenko, et al. | 707/3 |
| 5,577,241 | November 2005 | Spencer | 707/5 |
| 5,265,065 | November 2005 | Turtle | 707/4 |
| 5,321,833 | July 1994 | Chang, et al. | 707/5 |
| 5,659,732 | August 1997 | Kirsch | 707/5 |
| 5,544,352 | August 1996 | Egger | 707/5 |
| 5,920,854 | July 1999 | Kirsch, et al. | 707/3 |
| 5,933,822 | August 1999 | Braden-Harder, et al. | 707/5 |
| 6,070,158 | May 2000 | Kirsch, et al. | 707/3 |
| 6,145,003 | November 2000 | Sanu, et al. | 709/225 |

-continued

REFERENCES CITED
U.S. patent documents

| | | | |
|---|---|---|---|
| 6,233,571 | May 2001 | Egger, et al. | 707/2 |
| 6,256,623 | July 2001 | Jones | 707/3 |
| 6,275,820 | August 2001 | Navin-Chandra, et al. | 707/3 |
| 6,078,914 | July 2000 | Redfern | 707/3 |
| 6,278,993 | August 2001 | Kumar, et al. | 707/3 |
| 6,317,741 | November 2001 | Burrows | 707/5 |
| 6,336,116 | January 2002 | Brown, et al. | 707/10 |
| 6,434,548 | August 2002 | Emens, et al. | 707/3 |
| 6,442,544 | August 2002 | Kohli | 707/5 |
| 6,453,315 | September 2002 | Weissman, et al. | 707/5 |
| 6,480,837 | November 2002 | Dutta; Rabindranath | 707/3 |
| 6,484,166 | November 2002 | Maynard | 707/5 |
| 6,490,575 | December 2002 | Berstis | 707/3 |
| 6,523,026 | February 2003 | Gillis | 707/3 |
| 6,961,723 | November 2005 | Faybishenko, et al. | 707/1 |
| 6,526,400 | February 2003 | Takata, et al. | 707/3 |
| 6,560,600 | May 2003 | Broder | 707/7 |
| 6,665,655 | December 2003 | Warner, et al. | 707/2 |
| 6,687,696 | February 2004 | Hofmann, et al. | 707/6 |
| 6,718,324 | April 2003 | Edlund, et al. | 707/5 |
| 6,757,675 | June 2004 | Aiken, et al. | 707/3 |
| 6,763,362 | July 2003 | McKeeth | 707/104.1 |
| 6,785,671 | August 2004 | Bailey, et al. | 707/3 |
| 6,799,176 | September 2004 | Page | 707/5 |
| 6,801,906 | October 2004 | Bates, et al. | 707/3 |
| 6,947,936 | September 2005 | Suermondt, et al. | 707/7 |
| 6,947,932 | September 2005 | Brandin, et al. | 707/6 |
| 6,947,920 | September 2005 | Alpha | 707/1 |
| 6,963,867 | November 2005 | Ford, et al. | 707/3 |
| 6,950,814 | September 2005 | Bergan, et al. | 706/55 |
| 6,801,906 | October 2004 | Bates, et al. | 707/3 |
| 6,766,320 | July 2004 | Wang, et al. | 707/5 |
| 6,766,316 | July 2004 | Caudill, et al. | 707/3 |
| 6,728,704 | April 2004 | Mao, et al. | 707/3 |
| 6,714,934 | March 2004 | Fordham | 707/100 |
| 6,704,722 | March 2004 | Wang Baldonado | 707/3 |
| 6,701,312 | March 2004 | Lau, et al. | 707/5 |
| 6,578,022 | July 2003 | Foulger, et al. | 706/45 |
| 6,490,577 | December 2002 | Anwar | 707/4 |
| 6,278,992 | August 2001 | Curtis, et al. | 707/3 |
| 5,987,446 | November 1999 | Corey, et al. | 707/3 |

U.S. patent applications

| | | | |
|---|---|---|---|
| 20050216434 | September 2005 | Haveliwala, Taher H.; et al. | 707/1 |
| 20050120006 | June 2005 | Nye, Timothy G. | 707/3 |
| 20050076021 | April 2005 | Wu, Yuh-Cherng; et al. | 707/3 |
| 20050055340 | March 2005 | Dresden, Scott | 707/3 |
| 20050004905 | January 2005 | Dresden, Scott | 707/3 |
| 20040260688 | December 2004 | Gross, John N. | 707/3 |
| 20040254917 | December 2004 | Brill, Eric D.; et al. | 707/3 |
| 20040243568 | December 2004 | Wang, Hai-Feng; et al. | 707/3 |
| 20040044657 | March 2004 | Lee, Jae-Hak | 707/3 |
| 20040030690 | February 2004 | Teng, Albert Y.; et al. | 707/3 |
| 20040024756 | February 2004 | Rickard, John Terrell | |
| 20040010484 | January 2004 | Foulger, Michael G.; et al. | 706/50 |
| 20030120653 | June 2003 | Brady, Sean; et al. | 707/7 |
| 20020152199 | October 2002 | Teng, Albert Y.; et al. | 707/3 |

OTHER REFERENCES

1. Gravano, et al., "STARTS: Stanford Proposal for Internet Meta-Searching," 1997, ACM, XP000730508, pp. 207-218.
2. Gravano, Querying Multiple Document Collections Across The Internet, Phd. Thesis, 1998, UMI Order No. GAX98-10132.
3. The metasearch engines, http://www.evolt.org/article/The_Meta_Search_Engines/12/41694/, Oct. 9, 2002
4. SDLIP+STARTS=SDSTARTS, A Protocol and Toolkit for Metasearching, 2001, ACM, Pages: 207-214.
5. C. Yu, et al., "Efficient and Effective Metasearch for a Large No. of Text Databases," Tech. report, U. of Illinois at Chicago, 1999, http://citeseer.ist.psu.edu/yu99efficient.html, 2 pages.
6. Walter L. Warnick, PhD, et al., "Searching the Deep Web," D-Lib Magazine, January 2001, Vol. 7, No. 1, 11 pages.
7. Lucene API, http://lucene.apache.org/java/docs/index.html.

DETAILED DESCRIPTION OF PREFERRED EMBODIMENTS

Embodiments of the present invention are described herein in the context of a method and apparatus for emulating a competitive process. Those of ordinary skill in the art will realize that the following detailed description of the present invention is illustrative only and is not intended to be in any way limiting. Other embodiments of the present invention will readily suggest themselves to such skilled persons having the benefit of the disclosure. Reference will now be made in detail to the implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application—and business related constraints, and that these specific goals will vary from one implementation to another and from one developer to another. Moreover, it will be appreciated that such a development effort might be complex and time consuming, but would nevertheless be routine undertaking of engineering for those of ordinary skill in the art having the benefit of this disclosure.

In accordance with the present invention, the components, process steps, and/or data structures may be implemented using various types of operating systems, computing platforms, computer programs, and or/general purpose machines. In addition, those of ordinary skill in the art will recognize that devices of a less general purpose nature such as hardwired devices, field programmable gate arrays (FPGAs), application specific integrated circuits (ASICs), or the like, may also be used without departing from the scope and spirit of the inventive concepts disclosed herein.

The purpose and idea of the invention is to use results returned from popular search engines, vertical portals, hidden web, intelligent indexing, Guiding Info, a patent pending, U.S. application Ser. No. 11/162,735, Guide Selections patent pending, provisional U.S. application No. 60/656,645 to present semantically correct and relevant results.

Search engines index web pages using automated robots or web spiders that traverse one link to another and build a database of these links. They analyze the content of the page for word relevance, number of links to the page, word density, meta tags, links to a particular page, etc. Some of them try to understand the context of the word being searched and try to show words relevant to the search context.

The idea of the invention is to use these search engines for what has already been built and use the returned results for intelligent indexing. The intelligent index could also use results from its own search engine.

The intelligent index is made up of multiple indexes, a known index comprising of known terms, a semantic index comprising of semantic relationships and directives, and an unknown index. The known index contains search terms such as "Taco Bell", "Laptop computers", "LCD TV", "Laptop computer", "Mortgage Loans", "Transaxtions", etc. The idea here is that if a user searches for "LCD TV" the results should be related to information about a "LCD TV", what is a "LCD TV", different models, popular selections, market competitive information, etc. allowing the user to get the information about buying a "LCD TV" or knowing all about LCD TVs.

The second index will be a semantic index which will hold terms and their relationships and the context in which they are being used. For example, "xml escaping data" or "escaping xml data" should show results related to escaping in xml. Here the term "xml" holds the weight and it controls the context, while "escaping" is a term with a relationship to "xml" and means escaping special characters within the "xml" context. "data" is again related to the context "xml" and means all data related to "xml escaping". "xml data" will have a lesser weight and could mean pages with "xml" and any data. Another example would be "tantrums trouble discipline 10 year old". Here the context is a 10 year old, and trouble, discipline, tantrums are in relationship to the 10 year old. This could be rephrased as 10 year old, need a solution for tantrums, trouble, and discipline. The idea here is that users usually enter search terms as keywords and not Natural Language, so contexts could be made out from the keywords. The search terms could be ended with a phrase such as, "what to do", for eg. "toothache relief, what to do", will show results related to finding a relief for a tooth ache. A person looking for information about taxes needs to be given information related to taxes being filed, and maybe from the IRS and the state tax website during tax season. A person looking to solve a problem in Java needs to have information retrieved from the sun.com websites or a person looking to solve a problem in the open source tomcat application server needs to have information searched on the open source related websites and the many discussion groups related to the open source. This would provide more meaningful information.

The third index is an unknown term index and gets built using the intelligence of the users to associate a meaning to a search term and the results. The idea here is to use the user's knowledge of the returned results to semantically associate the search terms and the results. A search term starts as an unknown term the first time it is entered by the user i.e., the search term does not exist in the database. The search term is sent to the search engines and the returned results are stored with the search term as the index key. If the user selects any of the results, the selection is given a weight. If another user searches for similar terms, the stored results are returned using the weight to rank the results. Results with more weight will be at the top of the returned results. So as users keep searching and keep selecting the results the index keeps getting built with weights tracking the results. So when users search for a term "xml escaping data", the most selected pages are shown first. This allows popular pages to be at the top of the search. These pages will be related to the problem of "escaping XML", "XML data", "XML data tools", etc. The next step in this process is to collect all the search terms with the weights and see if they can link together, so that searching for "XML data" will also show terms with "escaping XML" and "XML schema".

FIG. 1 is an illustration of a user searching for the term "xml escaping". The results from the search are shown. 101 is the search term entered by the user. 102 is the results returned from the known index. 103 is the results from the unknown index. There is no guiding info associated with the known index. 104 is the results which the user is interested in viewing. But they are ranked 4 and 5. Let us assume the user selects 4 to read its contents, and then selects 5.

When the user selects 4, the weight attribute of the SearchDocument is incremented by 0.01. SearchDocument is an object that is stored in an ArrayList. It holds the contents in a Document Object and also has other attributes. weight is one of the attributes. Document is an org.apache.lucene.document.Document object. It has the following fields, "all" field, which holds the search term entered by the user, "id" field which holds the id for the object, "context" field holds a phrase showing the context of the url page, "url" field holds the url to access the pages. An org.apache.lucene.index.IndexWriter object is used to create and manage an index of results returned from the search engines. A Document object is created for each url returned by the search engines, and the Document object is added to the index. A SearchDocument object is created for each Document object and the contents of the Document are copied. The same process is followed when the user selects 5.

Figure 2:
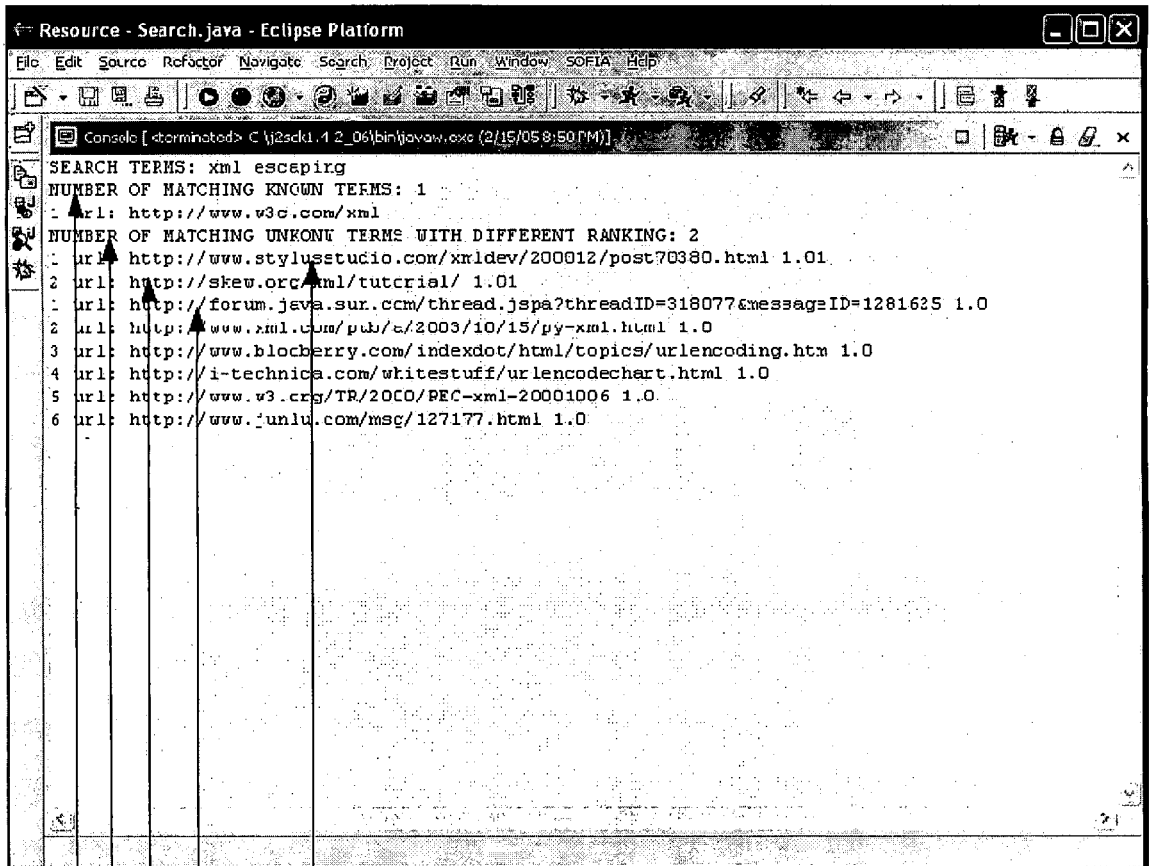
FIG. 2 is an illustration of a second user searching for "xml escaping" something similar to what the first user was searching.

FIG. 2 is an illustration of a second user searching for "xml escaping", something similar to what the first user was searching. 201 is the search term entered by the user. 202 is the results returned by the known index. 203 is the search returned by the unknown index. 204 is the new ranking for item number 4 selected by user1. 205 is the new ranking for item number 5 selected by user1. The weights for 4 and 5 were increased by 0.01 when user1 selected the links. There is no guiding info associated for the search.

Figure 3:
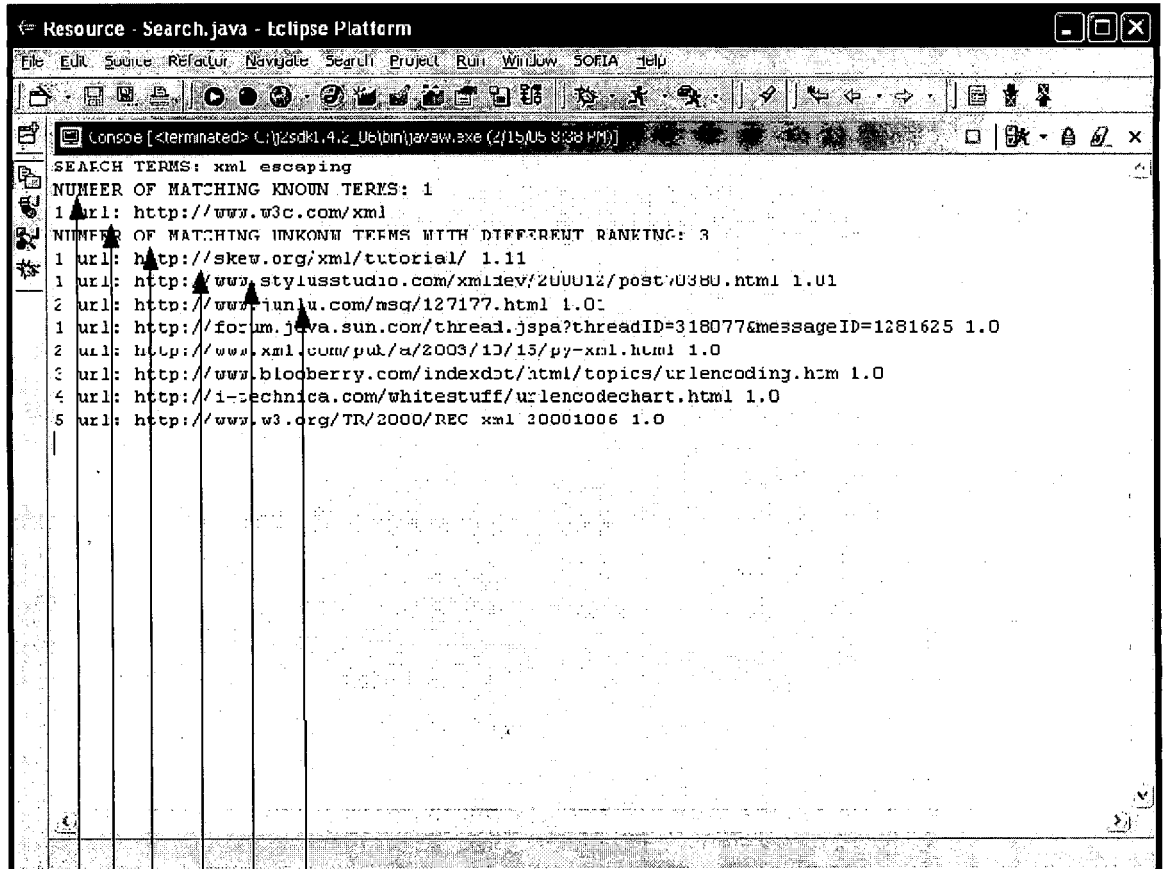
FIG. 3 is an illustration of the search results returned for user3.

Let us assume that user2 now selects the 2nd ranking now (previously number 5) and then selects link at ranking 3. The weight for 2 goes up by 0.01 and so the new weight will be 1.02. The weight for 3 goes up by 0.01 so will increase to 1.01. The weights are incremented by changing the weight attribute value in the SearchObjects for 2 and 3. If a new user, user3 searches for "xml escaping", the following results will be returned, the item at ranking 2 previously, is now at 1, item at ranking 1 previously is at ranking 2, and item 3 at ranking 3 previously, is at 3. FIG. 3 is an illustration of the search results returned for user3. 301 is the search term, 302 is the results from the known index, and 303 is the results from the unknown index. 304, 305, 306 show the new rankings. 304 is now ranked 1, was ranked 2 for user2. 305 is now ranked 2, was ranked 1 for user2. 306 is at rank3 for user2 and user3.

Figure 4A:
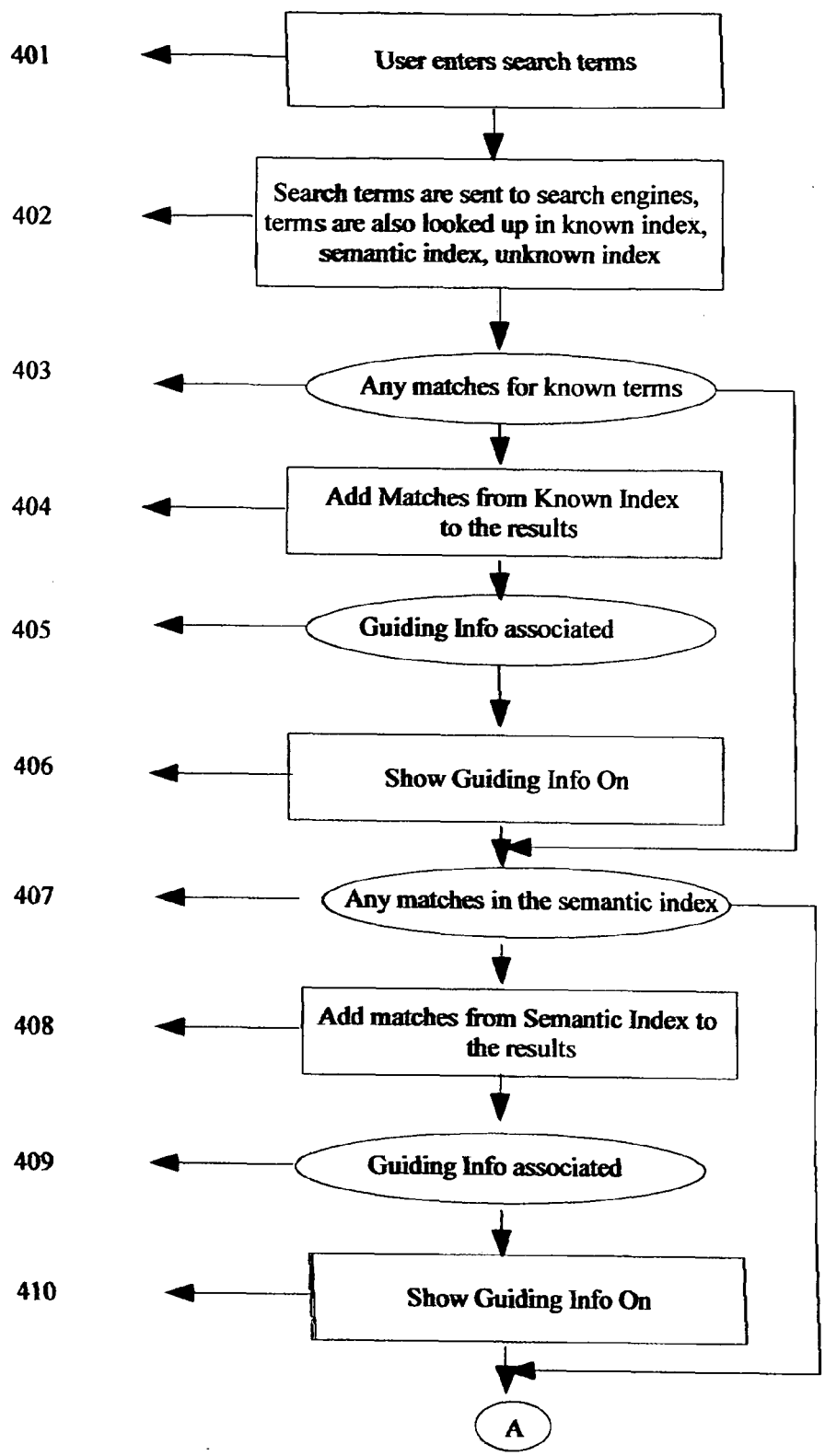
FIGS. 4a, 4b are flow charts illustrating the index being created, links being added dynamically, and a walk through the search process.
Figure 4B:
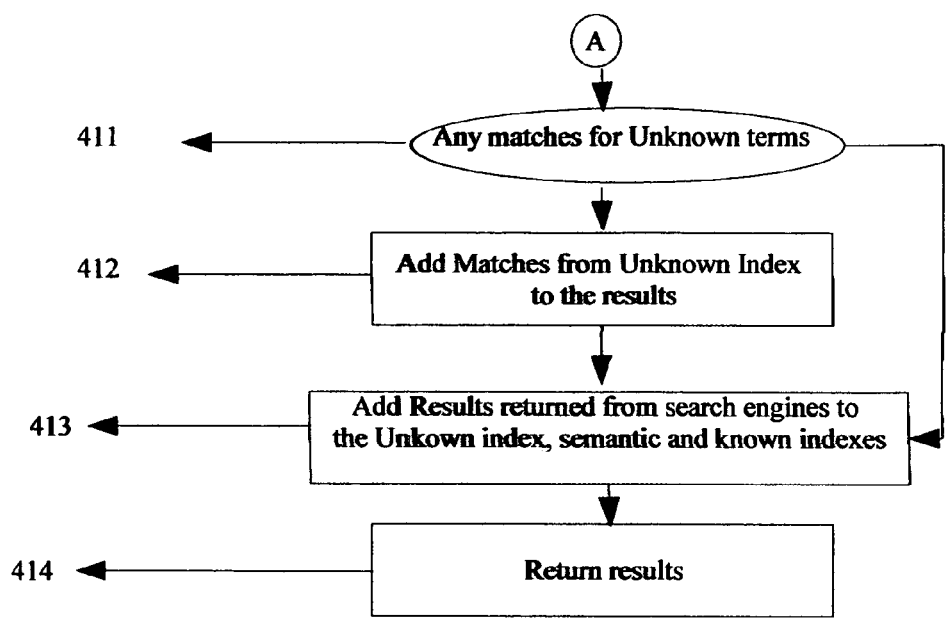

FIGS. 4a, 4b are flow charts illustrating the index being created, links being added dynamically, and a walk through the search process. 401 is the step where a user enters the search terms. This could be in a browser window search field in an embodiment. 402 is the step where the search terms are sent to other search engines and also looked up in the known, semantic and unknown index. 403, the search term is also looked up in the known index for a match. If there is a match, the matched results are added to the returned results. 404, the results are looked up using the IndexSearcher object. Next a query object is created using the Query.parse method with the search term as one of the parameters. The other parameters are the field name, and the type of Analyzer. The analyzer used is a PorterStemAnalyzer. A BoostHitCollector is used to collect the results from the query. The searcher object is used to query for the search results. The Query object and the BoostHitCollector object are the parameters for the search. The results of the query are obtained by calling the BoostHitCollector getResults method. This returns a binary tree, TreeSet object. The tree has to be traversed to obtain the results. During the search process, the BoostHitCollector collect method is called with doc index and the score for the item.

The collect method checks to see if the score is greater than 0.75 so as to include the results; the doe index is used to obtain the Document object, and the id field is retrieved. This id field is then used to index into the ArrayList of SearchObjects. The SearchObject is then added to another ArrayList which is then added to a TreeSet object to hold the results.

405, the SearchObject has an attribute, guidinginfo, and if this is true, the category_id attribute holds the category for the guiding info, and the sub_category_id attribute holds the sub_category_info. 406, if the guidinginfo attribute is true, the guiding info is also shown with the search results.

407, 408, 409, 410 look up information from the semantic index to find matches with a semantic relationship. The semantic index match might involve transforming the search terms with additions or deletions or rewording to enable a semantic search. For eg., the search terms "xml escaping" could be transformed to "xml and (escaping or encoding decoding or &)" ie. terms associated with xml escaping, to query the index and the other search engines. A SemanticAnalyzer is used to transform the search terms entered by the user. The search terms are parameters to the contextTerms methods which returns the transformed terms that can be sent to search engines or looked up in the indexes.

FIG. 4b, 411 shows the search terms being looked up in the unknown index. The unknown index again uses the IndexSearcher and a PorterStemAnalyzer. Next a query object is created using the Query.parse method with the search term as one of the parameters. The other parameters are the field name, and the type of Analyzer. A BoostHitCollector is again used to collect the results from the query. The searcher object is used to query for the search results. The Query object and the BoostHitCollector object are the parameters for the search. 412, the results of the query are obtained by calling the BoostHitCollector get results method. This returns a binary tree, TreeSet object. The tree has to be traversed to obtain the results. During the search process, the BoostHitCollector collect method is called with doc index and the score for the item. The collect method checks to see if the score is greater than 0.75 so as to include the results; the doc index is used to obtain the Document object, and the id field is retrieved. This id field is then used to index into the ArrayList of SearchObjects. The SearchObject is then added to another ArrayList which is then added to a TreeSet object to hold the results. The TreeSet object uses the comparator method to sort the results. The comparator object, BoostComparator is supplied to the TreeSet object at creation. The comparator method has two parameters, which are both ArrayLists. The first object in the two ArrayLists are retrieved, and this should be the SearchObject added to the ArrayList in the BoostHitCollector collect method. The weight attribute in the SearchObjects are compared and a 0, 1 or −1 is returned. The weight attribute is set based on the user selecting a link.

413, Results returned by the other search engines are mixed with the results from the known, semantic and unknown indexes and the mixed results are again ranked by relevance taking into account any user feedback. FIG. 8 shows search results from the query "xml escaping". 801 shows results from the known index and also shows the terms used in the search. Results shown are from a search within the known index without any mix from other search engines. 802 shows results from the semantic index. The results from the index have been mixed with results from an external search engine in this embodiment. 802 also shows the modified terms used in the search, "xml and (escaping or encoding or decoding)". The modified terms are used to search within the semantic index and also sent out to an external search engine. The returned results are mixed and ranked based on relevance and user feedback. 803 shows a link ranked at position 4 in the shown results that is very pertinent to the search terms "xml escaping". This link will be selected to access the link contents. 804 shows results from the query "xml escaping" in the unknown index and also the terms used for the search. The results shown have been mixed with results from an external search engine in this embodiment. 804 also shows that the terms used for the search within the index and that is sent out to the external engine. 805 shows results with feedback from the unknown index mixed with results from the external search engine. The results from the unknown index have weights 1.01 as shown in this embodiment and the mixed results have been ranked based on relevance and user feedback.

FIG. 9 shows results for the same query "xml escaping" made by another user. 901 shows results from the known index and also shows the terms used in the search. 901 is similar to 801 as there have been no changes to the index. 901 will be the link selected by the user in this embodiment. 902 shows results from the semantic index. 902 also shows the terms "xml and (escaping or encoding or decoding)" used in the search within the index and sent out to an external search engine. 902 also shows the new ranking of the results taking into account the feedback from 803 where a link was selected by the user. The link is now ranked at the $1^{st}$ position. 903 shows results from the unknown index. It also shows the terms used to search within the index and that is sent out to an external search engine. The results and ranking are the same as seen in 804 and 805 as there have been no changes to the index.

FIG. 10 shows results for the same query "xml escaping", made by another user. 1001 shows results from the known index and also shows the terms used in the search. 1001 is similar to 901 and 801 but now shows the feedback from the link selection in 901. The weight for the link is now 1.01. 1002 shows results from the semantic index and also shows the terms "xml and (escaping or encoding or decoding)" used in the search within the index and that is sent out to the external search engine. 1002 is similar to 902 as there is no change in the ranking. 1003 shows results from the unknown index. It also shows the terms used in the search and that is sent out to the search engine. The results and ranking are the same as seen in 903, 804 and 805 as there have been no changes to the index.

Adding to an index based on feedback in an embodiment is by creating a new Document object. The search terms are added to the "all" field as the value to be indexed. A Text field is used for indexing. Next a new ID is requested from the ID generator, and this is added to an "id" field. The "id" field is again a Text field. The URL from the search engine is added to the "url" field. A Keyword field is used to hold this. The context text with the URL is stored in a "context" field. The Document object is then added to the index using the IndexWriter. Before the document object is added, a check is made so that duplicate URLs are not stored. The feedback weight is stored in a database using the id as the key along with terms, index, ip address, etc. When users click on a link, the link id is used to access the database and add the link if it does not exist or update the weight by incrementing it by 0.01 before transferring the user in an embodiment. When the index is accessed next, the weight is accessed using the id from the database to rank the results based on feedback and relevance.

414, the results are returned to be rendered on to the user.

It should be noted that in the described embodiment, an object oriented programming environment has been described to discuss the present invention. Object Oriented Constructs such as methods, object, and exceptions have been used to describe how the invention works. However, this can also be implemented in other programming environments, languages and with different library components. It should also be noted that this is an illustration of one embodiment, and the search and insertion into the indexes can be done in parallel, the insertion might also be done only if needed as by feedback or every time to build the indexes. In this embodiment the external search engine results are shown to mix with semantic and unknown indexes but can be mixed with the known index results also. The search is illustrated making use of an external search engine and mixing the results but in another embodiment, only the intelligent index can be searched without the need for other search engines either internal or external. The feedback is stored in the database in this embodiment but in another embodiment the link in the index itself can be modified to keep track of the feedback. Feedback as illustrated in the embodiment increments a weight but in another embodiment feedback can decrement the weight so as to lower a link's relevance. In this embodiment all three indexes have been rendered but in other embodiments just one of the index like the unknown index can be rendered or all the indexes combined and rendered under a single results section. The descriptions shown are illustration of an embodiment and can be implemented in a plurality of ways and should not be limited to as described.

Figure 5:
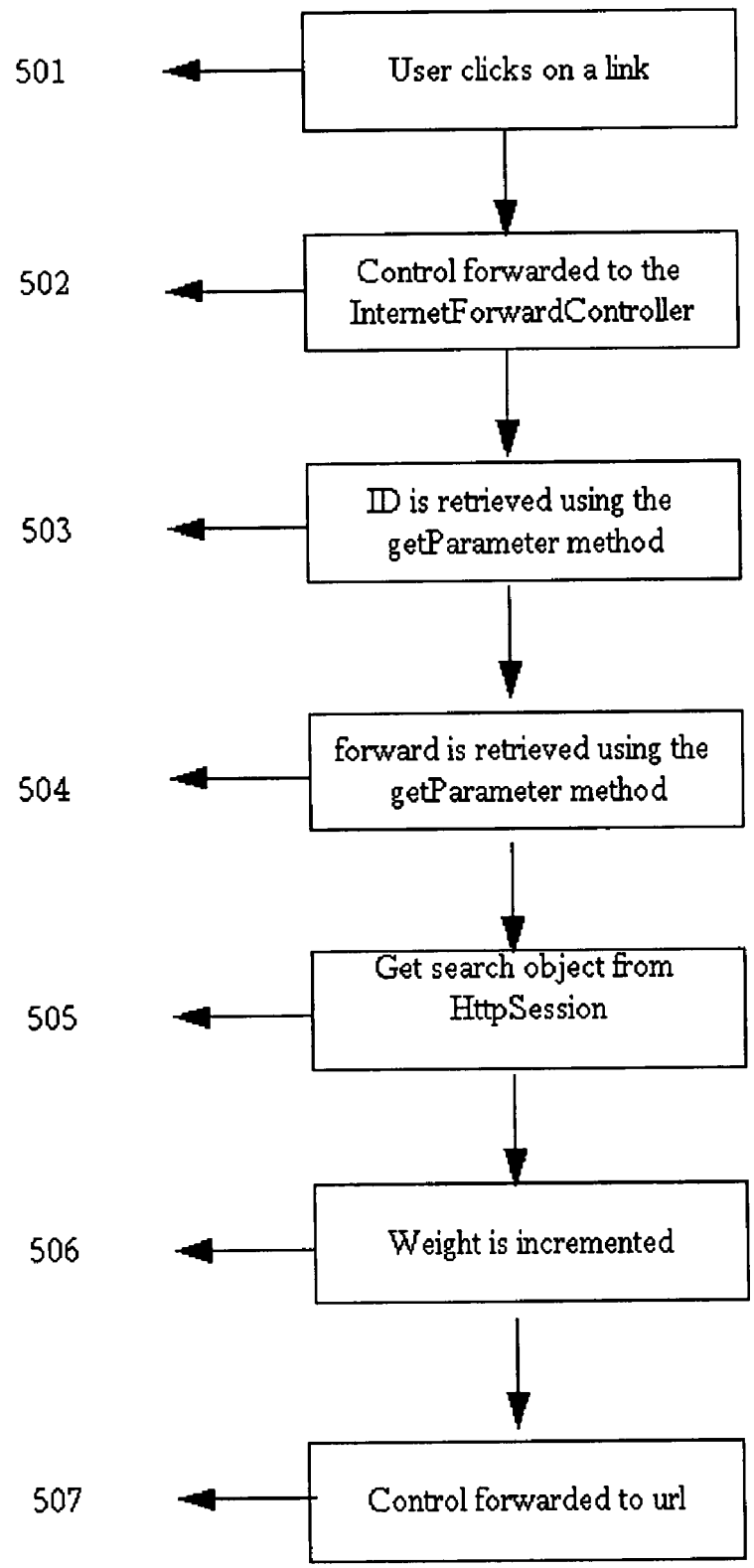
FIG. 5 is a flowchart illustrating what happens when a user selects a link by clicking on it.

FIG. 5 is a flowchart illustrating what happens when a user selects a link by clicking on it. 501, the user clicks on a link. 502, the control is forwarded to InternetForwardController object. 503, the ID is retrieved using the getParameter method. 504, the forward url is retrieved using the getParameter. 505, the search object is retrieved from the HttpSession, and the incWeight method is called using the id as the parameter. 506, the incWeight method indexes into the ArrayList of SearchObjects and retrieves the SearchObject for the id. The weight attribute is incremented by 0.01. 507, the forward url is decoded using URLDecoder and the control is passed to the url page using the sendRedirect method.

Figure 6:
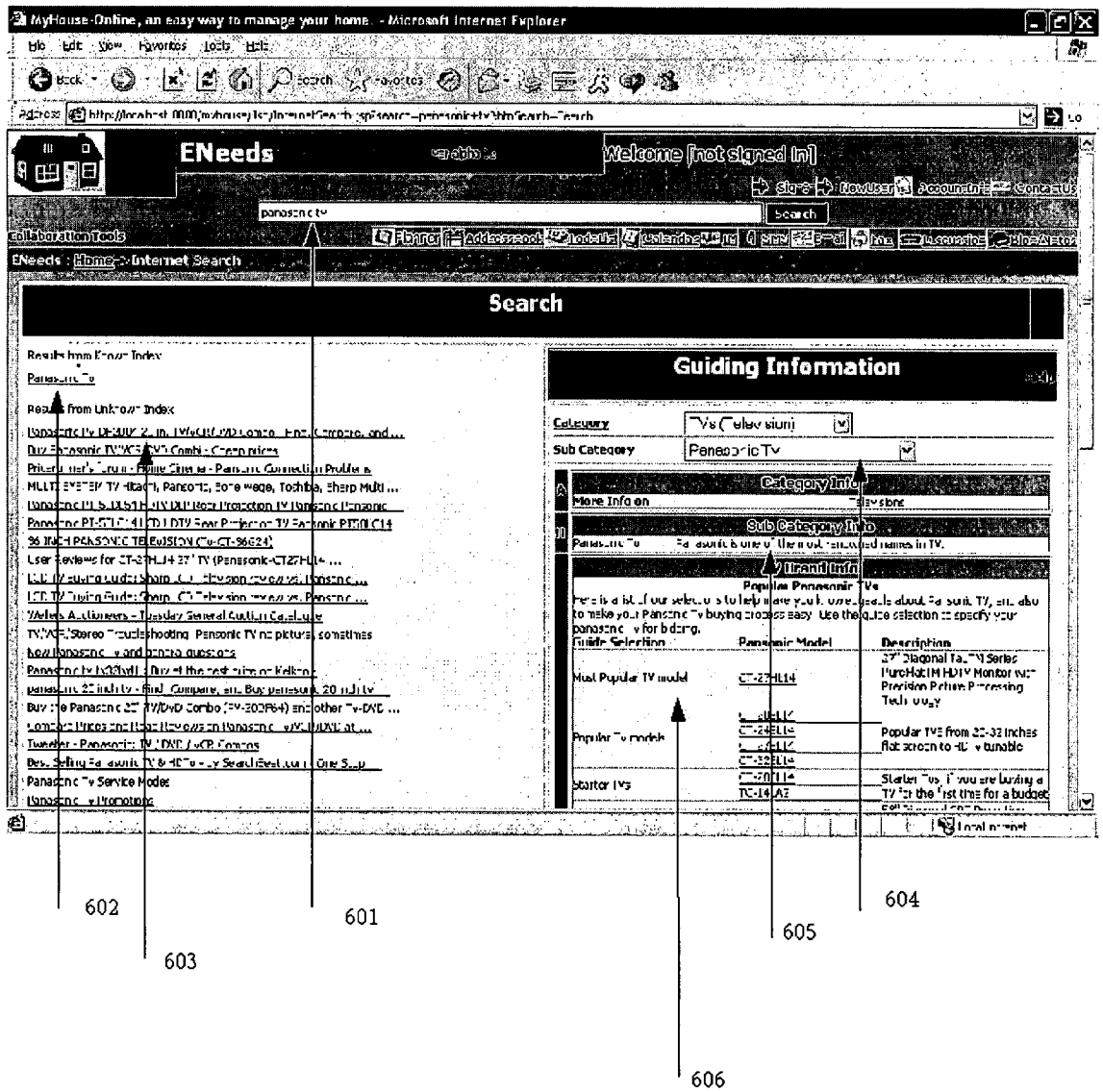
FIG. 6 is an illustration of the search results shown along with guiding info.
Figure 7:
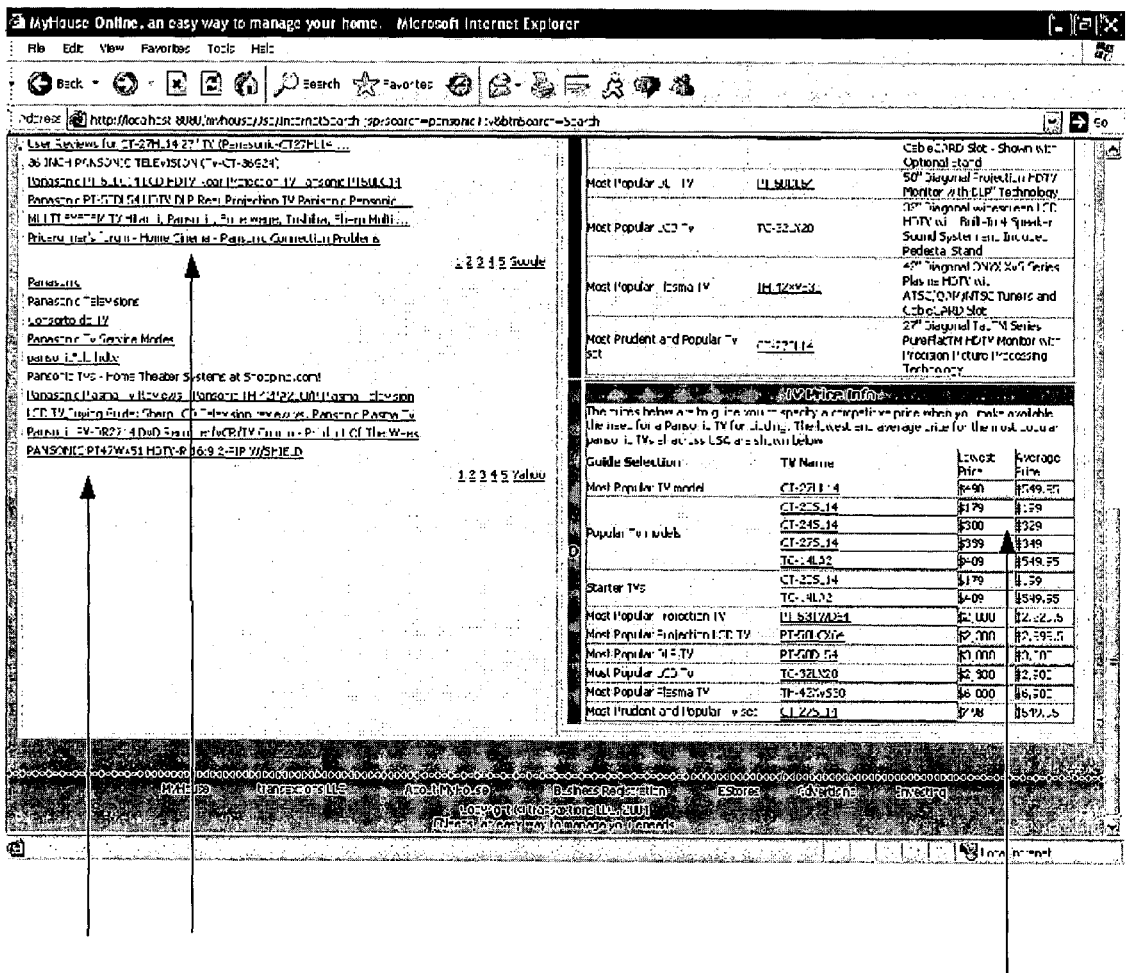
FIG. 7 is an illustration of the search results shown along with guiding info, a continuation of FIG. 6.

FIG. 6 is an illustration of the search results shown along with guiding info. 601 is the search terms entered by the user, "Panasonic TV". 602 is the results returned from the known index. The control is transferred to the InternetSearchController object, when the user hits enter key or search button The InternetControllerObject creates a Search object if one has not been created. A search object reads the documents in the existing indexes on disk and initializes the ArrayList. The InternetSearchController then makes the search needed to search Google and Yahoo search engines. The search request is sent to Google and Yahoo search engines through searchGoogle and searchYahoo methods. The results returned from google are added to the UnknownIndex through indexGoogle method. This checks if the results already exist in the index, if not they are added to the index. The results from the Knownindex are obtained through getKnownIndexResults method. The getKnownIndexResults method returns a SearchDocument object if guidinginfo needs to be shown. The SearchDocument object contains the category_id and sub_category_id of the guiding info to be shown. 603 is the results from the Unknownindex. 604 is the guiding info for "Panasonic TV" the search term entered by the user. The guidinginfo is like an expert engine, the next generation comparative shopping portal, and provides information on the selected category and sub category along with a guide selection of popular choices, the lowest and average prices for the popular choices locally as well as nationally. 605 is information about the sub category "Panasonic TV". 606 is the popular guide selections. FIG. 7 is an illustration of the bottom part of the browser from FIG. 6. 701 is the results returned from Google search engine. 702 is the results returned from Yahoo search engine. 703 is the lowest and average prices for the popular guide selection. The selection shows all the popular "Panasonic TV" models.

It should be noted that in the described embodiment search engines google and yahoo have been shown. This is an illustration of one embodiment and other search engines including its own search engines can be used to build the intelligent index.

Definition List 1

| Term | Definition |
| --- | --- |
| GET | A HTTP method to send/get data from a server |
| POST | A HTTP method to send/get data from a server |
| HTTP | A TCP/IP based text request/response protocol that allows web browsers to show data from a server called a web server |
| Session | A J2EE HTTP session object, and provides a way to identify a user across more than one page request or visit to a Web site and to store information about that user. |
| J2EE | Java 2 Platform, Enterprise Edition defines the standard for developing component-based multitier enterprise applications |
| Jsp | JavaServer Pages technology provides a simplified, fast way to create dynamic web content |
| lucene | An open source search API |
| Salmon Open Source Framework | An open source MVC J2EE server framework for building J2EE applications |
| URL | Uniform Resource Locator |
| XML | Extensible Markup Language |
| TCP | Transmission Control Protocol |
| IP | Internet Protocol |
| Java | An object oriented programming language |
| MVC | Model View Controller paradigm |
| Web | World wide web, www, also known as the internet |
| Browser | A Graphical User Interface for viewing content called html on the web |
| ENeedsOnline | An online marketplace where buyers and sellers can make available a need, http://www.eneedsonline.com |
| BoostHitCollector | A Java Object that is used to collect search the results |
| Commscore | Market research firm |
| Google | http://www.google.com |
| Yahoo | http://www.yahoo.com |

While embodiments and applications of this invention have been shown and described, it would be apparent to those skilled in the art having benefit of this disclosure that many more modifications than mentioned above are possible without departing from the inventive concepts herein. The invention, therefore, is not to be restricted except in the spirit of the appended claims.

What is claimed is:

1. A method for searching on the Internet or intranet in a computer system using an intelligent index, the method comprising:
 a user entering a query containing one or more search terms in a search window;
 sending the one or more search terms to other search engines;
 searching the one or more search terms in the intelligent index, wherein the intelligent index consists of a known index, a semantic index, and an unknown index;
 wherein the known index comprises a plurality of terms, each term in the known index being associated with at least one resource, and at least one term in the known index being associated with guiding information;

wherein the semantic index comprises a plurality of terms, each term in the semantic index being associated with at least one other term in the semantic set of terms, each term in the semantic index being associated with a context;

wherein the unknown index comprises a plurality of search terms, each search term in the unknown index being associated with a set of results produced by the other search engines in response to a query with the search term, each result from the other search engines containing a weight, wherein the weight for each result is incremented when a user searching for the search term selects the result;

wherein searching the one or more terms in the intelligent index comprises:

sending the one or more search terms to other search engines;

searching the known index for the one or more search terms and adding any results from the known index to a list of returned results;

after searching the known index for the one or more search terms, searching the semantic index for the one or more search terms by transforming the query by performing at least one of: adding additional search terms to the query, deleting search terms from the query, and rewording the one or more search terms of the query;

adding the results from searching the semantic index to the list of returned results;

after searching the semantic index, searching the unknown index for the one or more search terms;

if there are results from searching the unknown index, adding the results from the unknown index to the list of returned results;

adding results received from the other search engines to the known index, the semantic index, and the unknown index;

displaying the list of returned results to the user;

wherein the one or more search terms are associated with guiding information;

displaying the guiding information to the user, wherein the guiding information includes the category of the one or more search terms, the subcategory of the one or more search terms, most popular results from the one or more search terms, lowest local price for popular results, lowest national price for popular results, average local price for popular results, and average national price for popular results.

2. The method according to claim 1, wherein the results are presented to a plurality of users; said presentation in the form of known index results, semantic index results, and unknown index results; said presentation including guiding information and guide selections; said presentation including a feedback mechanism; and said presentation including popularity information.

3. The method according to claim 1, wherein the results are presented to a plurality of users and feedback from the plurality of users; said presentation including guiding information and guide selections; said presentation including feedback mechanism; said presentation including popularity information.

4. The method according to claim 1, wherein each term in the known index is based on one of presence, time, or locality;

wherein a plurality of users provides feedback on each term in the known index;

wherein said feedback is used to rank each term in the known index.

5. The method according to claim 1, wherein the semantic index directs searches to context specific websites, based on one of presence, time, or locality;

wherein the semantic index is associated with guiding information and guide selections;

wherein a plurality of users provides feedback on each term in the semantic index;

wherein said feedback is used to rank each term in the semantic index.

6. The method according to claim 1, wherein a plurality of users provide feedback on each term in the unknown index;

wherein said feedback is used to rank each term in the unknown index;

wherein said feedback on a term in the unknown index moves the term to the known or semantic index.

7. A program storage device embodying instructions readable by a machine to perform a method of searching on the Internet or intranet using an intelligent index with feedback, the instructions comprising:

a user entering a query containing one or more search terms in a search window;

sending the one or more search terms to other search engines;

searching the one or more search terms in the intelligent index, wherein the intelligent index consists of a known index, a semantic index, and an unknown index;

wherein the known index comprises a plurality of terms, each term in the known index being associated with at least one resource, and at least one term in the known index being associated with guiding information;

wherein the semantic index comprises a plurality of terms, each term in the semantic index being associated with at least one other term in the semantic set of terms, each term in the semantic index being associated with a context; wherein the unknown index comprises a plurality of search terms, each search term in the unknown index being associated with a set of results produced by the other search engines in response to a query with the search term, each result from the other search engines containing a weight, wherein the weight for each result is incremented when a user searching for the search term selects the result;

wherein searching the one or more terms in the intelligent index comprises:

sending the one or more search terms to other search engines;

searching the known index for the one or more search terms and adding any results from the known index to a list of returned results;

after searching the known index for the one or more search terms, searching the semantic index for the one or more search terms by transforming the query by performing at least one of: adding additional search terms to the query, deleting search terms from the query, and rewording the one or more search terms of the query;

adding the results from searching the semantic index to the list of returned results;
after searching the semantic index, searching the unknown index for the one or more search terms;
if there are results from searching the unknown index, adding the results from the unknown index to the list of returned results;
adding results received from the other search engines to the known index, the semantic index, and the unknown index;
displaying the list of returned results to the user;
wherein the one or more search terms are associated with guiding information;
displaying the guiding information to the user, wherein the guiding information includes the category of the one or more search terms, the subcategory of the one or more search terms, most popular results from the one or more search terms, lowest local price for popular results, lowest national price for popular results, average local price for popular results, and average national price for popular results.

8. The program storage device according to claim 7, wherein the results are presented to a plurality of users; said presentation in the form of known index results, semantic index results, and unknown index results; said presentation including guiding information and guide selections; said presentation including a feedback mechanism; and said presentation including popularity information.

9. The program storage device according to claim 7, wherein the results are presented to a plurality of users and feedback from the plurality of users; said presentation including guiding information and guide selections; said presentation including feedback mechanism; said presentation including popularity information.

10. The program storage device according to claim 7,
wherein each term in the known index is based on one of presence, time, or locality;
wherein a plurality of users provides feedback on each term in the known index;
wherein said feedback is used to rank each term in the known index.

11. The program storage device according to claim 7,
wherein the semantic index directs searches to context specific websites, based on one of presence, time, or locality;
wherein the semantic index is associated with guiding information and guide selections;
wherein a plurality of users provides feedback on each term in the semantic index;
wherein said feedback is used to rank each term in the semantic index.

12. The program storage device according to claim 7
wherein a plurality of users provide feedback on each term in the unknown index;
wherein said feedback is used to rank each term in the unknown index;
wherein said feedback on a term in the unknown index moves the term to the known or semantic index.

13. An apparatus for making available a search on the intranet or the internet using an intelligent index with feedback in a computer system, the apparatus comprising:
a computer performing a search on the internet or the intranet using said intelligent index;
a user entering a query containing one or more search terms in a search window;
sending the one or more search terms to other search engines;
searching the one or more search terms in the intelligent index, wherein the intelligent index consists of a known index, a semantic index, and an unknown index;
wherein the known index comprises a plurality of terms,
each term in the known index being associated with at least one resource, and
at least one term in the known index being associated with guiding information;
wherein the semantic index comprises a plurality of terms,
each term in the semantic index being associated with at least one other term in the semantic set of terms,
each term in the semantic index being associated with a context; wherein the unknown index comprises a plurality of search terms,
each search term in the unknown index being associated with a set of results produced by the other search engines in response to a query with the search term,
each result from the other search engines containing a weight,
wherein the weight for each result is incremented when a user searching for the search term selects the result;
wherein searching the one or more terms in the intelligent index comprises:
sending the one or more search terms to other search engines;
searching the known index for the one or more search terms and adding any results from the known index to a list of returned results;
after searching the known index for the one or more search terms, searching the semantic index for the one or more search terms by transforming the query by performing at least one of: adding additional search terms to the query, deleting search terms from the query, and rewording the one or more search terms of the query;
adding the results from searching the semantic index to the list of returned results;
after searching the semantic index, searching the unknown index for the one or more search terms;
if there are results from searching the unknown index, adding the results from the unknown index to the list of returned results;
adding results received from the other search engines to the known index, the semantic index, and the unknown index;
displaying the list of returned results to the user;
wherein the one or more search terms are associated with guiding information;
displaying the guiding information to the user, wherein the guiding information includes the category of the one or more search terms, the subcategory of the one or more search terms, most popular results from the one or more search terms, lowest local price for popular results, lowest national price for popular results, average local price for popular results, and average national price for popular results.

14. The apparatus according to claim 13, wherein the results are presented to a plurality of users; said presentation in the form of known index results, semantic index results, and unknown index results; said presentation including guiding information and guide selections; said presentation including a feedback mechanism; and said presentation including popularity information.

15. The apparatus according to claim 13, wherein the results are presented to a plurality of users and feedback from the plurality of users; said presentation including guiding information and guide selections; said presentation including feedback mechanism; said presentation including popularity information.

16. The apparatus according to claim 13,
    wherein each term in the known index is based on one of presence, time, or locality;
    wherein a plurality of users provides feedback on each term in the known index;
    wherein said feedback is used to rank each term in the known index.

17. The apparatus according to claim 13,
    wherein the semantic index directs searches to context specific websites, based on one of presence, time, or locality;
    wherein the semantic index is associated with guiding information and guide selections;
    wherein a plurality of users provides feedback on each term in the semantic index;
    wherein said feedback is used to rank each term in the semantic index.

18. The apparatus according to claim 13,
    wherein user feedback on a term in the unknown index moves the term to the known or semantic index.

* * * * *